(12) United States Patent
Shimada et al.

(10) Patent No.: US 6,784,231 B2
(45) Date of Patent: Aug. 31, 2004

(54) PIGMENT, METHOD FOR PRODUCING PIGMENT, PIGMENT DISPERSION, AND ELECTROSTATIC IMAGE DEVELOPING POWDER TONER

(75) Inventors: Katsunori Shimada, Kashima-gun (JP); Junko Sunouchi, Kashima-gun (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 113 days.

(21) Appl. No.: 10/100,063

(22) Filed: Mar. 19, 2002

(65) Prior Publication Data

US 2003/0110982 A1 Jun. 19, 2003

(30) Foreign Application Priority Data

Sep. 21, 2001 (JP) .................................. P2001-289165

(51) Int. Cl.$^7$ ...................... C09B 35/22; C09B 35/035; D06P 1/18; D06P 1/44
(52) U.S. Cl. ..................... 524/93; 106/447; 106/448; 106/493; 106/494; 106/498; 548/305.7
(58) Field of Search ............................. 524/93; 106/447, 106/448, 493, 494, 498; 548/305.7

(56) References Cited

U.S. PATENT DOCUMENTS 4,870,164 A 9/1989 Kühne et al.

FOREIGN PATENT DOCUMENTS

| | | |
|---|---|---|
| EP | 0 024 702 | 4/1981 |
| EP | 0 705 886 | 4/1996 |
| JP | 56-38354 | 4/1981 |
| JP | 8-209017 | 8/1996 |
| JP | 8-295815 | 11/1996 |

*Primary Examiner*—Kriellion A. Sanders
(74) *Attorney, Agent, or Firm*—Armstrong, Kratz, Quintos, Hanson & Brooks, LLP (57) ABSTRACT

A pigment having weak dispersion force to be readily dispersed in a medium to be colored from which an excellent yellow image having superior transparency can be produced. The pigment includes a compound having the same chemical formula as C.I. Pigment Yellow 180. The BET specific surface area based on the nitrogen absorption process of the pigment is 20–100 m$^2$/g, and the ratio of the absolute strength of X-ray diffraction at Bragg angle $2\theta=17.5°\pm0.2°$ to the absolute strength of X-ray diffraction at Bragg angle $2\theta=18.2°\pm0.2°$ of the pigment in a powder X-ray diffraction diagram using a CuKα characteristic X-ray is less than 1.8/1.0. The present invention also provides a dispersion including the pigment and a thermoplastic resin having excellent transparency and color strength.

10 Claims, 6 Drawing Sheets

PIGMENT, METHOD FOR PRODUCING PIGMENT, PIGMENT DISPERSION, AND ELECTROSTATIC IMAGE DEVELOPING POWDER TONER

BACKGROUND OF THE INVENTION

1. Field of the Invention

The present invention relates to acetoacetic acid arylide type disazo pigments and to pigment dispersions thereof. More specifically, the present invention relates to an acetoacetic acid arylide disazo type pigment and to a pigment dispersion, which is useful in various applications, including coloring materials such as ink, paint, plastic, color toner, and color filter.

2. Description of Related Art

C.I. Pigment Yellow 180 including 2,2'-[1,2-ethanediyl-bis(oxy 2,1-phenyleneazo)] bis [N-(2,3-dihydro-2-oxo-1H-benzimidazole-5-yl)-3-oxo-butaneamide (hereinafter referred to as a basic substance) is known as a useful yellow colorant, and has been used for various purposes. The basic substance can be obtained by a diazocoupling reaction, and since it has the structure derived from one of the raw materials, i.e., a benzimidazolone compound, the pigment has significantly high light fastness, improved overcoating fastness when applied to paint, and improved migration fastness and high thermostability as applied to a synthetic resin. The term "pigment", in contrast with the definition of a dye, means, in its broader application, fine powder which does not dissolve or is insoluble in water or organic solvent. This also applies to the above basic substance. In the present invention, in accordance with the above definition, a crude pigment, which will be described later, is also included in pigments.

Also, since 1,2-bis(2-aminophenoxy)-ethane, not dichlorobenzidines which are mutagenic, is used as the raw material for a bisdiazonium salt, which is the other substance used for the diazocoupling reaction, in the production of the basic substance, C.I. Pigment Yellow 180 is one of the few yellow colorant among acetoacetic acid arylid disazo type agents that can be used for, for instance, a preparation for electrostatic image developing toner, to which "Blauer Engel" (long title: "Das Umweltzeichen" meaning "environmental protection label", a German ecological mark) certified by the German Confederation Environment Agency and operated by German Quality Assurance Label Association, is issued.

Japanese Unexamined Patent Application, First Publication No. Sho 56-38354, Japanese Unexamined Patent Application, First Publication No. Hei 8-209017, and Japanese Unexamined Patent Application, First Publication No. Hei 8-295815 disclose C.I. Pigment Yellow 180 containing the above basic substance.

Despite the above-mentioned broad definition of pigment, all of the conventional manufacturing methods for C.I. Pigment Yellow 180 described in these publications include a first process in which a bisdiazonium salt of 1,2-bis(2-aminophenoxy) ethane is coupled with 5-acetoacetylamino-benzimidazolone to obtain crude pigment, and a subsequent second process in which the crude pigment obtained in the first process is filtered and added to a liquid medium containing organic solvent as an essential component. Then, the liquid medium is subjected to a heat process and a colorant is produced.

Note that in this field of industry, the above-mentioned "crude pigment" has the same meaning as "prepigment" and "crude". Likewise, the above-mentioned second process is also referred to as an aftertreating process, a finishing process, a conditioning process, or a pigmentization process. All of these terms have the same meaning.

On the other hand, the BET specific surface area based on the nitrogen absorption method, and the strength of each diffraction peak of a crystal based on Bragg angles measured by using CuKα characteristic X-ray are examples showing important physical characteristics of pigment. These characteristics, together with the particle size of the pigment, are often used as indices for estimating characteristics of the pigment, such as the readiness of being dispersed in a dispersion medium, for example, vehicle, and the flow properties of a colored dispersion medium obtained.

In C.I. pigment Yellow 180 including the above mentioned basic substance, the particle size of the pigment affects various properties of a dispersion medium colored by using the colorant, such as brightness, transparency, color strength, hue, and flow properties, in the application of printing ink, for example. As for the pigment which has been subjected to the above second process, the smaller the particle size of primary particle thereof, the more its brightness, transparency, and color strength tend to increase. The reason for this is because, in the pigment whose degree of aggregation among particles is smaller (or weaker) than that of a crude pigment, which will be described later, the dispersibility of the primary particle thereof in a dispersion medium to be colored is better. In such a pigment, aggregation of the particles hardly occurs and they can be dispersed in a dispersion medium to be colored in a primary particle level. The measured specific surface area of such pigment having excellent brightness is larger than that of a crude pigment. That is, as for pigment which is subjected to the above second process, there is a tendency that the smaller the particle size of the primary particle of pigment, the larger the specific surface area thereof.

On the other hand, conventional crude pigments including the above basic substance corresponding to C.I. pigment Yellow 180 have lower crystallinity in the primary particle level and smaller particle size than the pigment which is subjected to the second process. Since the primary particles thereof are smaller as compared with the pigment subjected to the second process, the surface energy of the crude pigment is significantly higher, and as a result, the aggregation among the primary particles tends to increase in the crude pigment. Such a strong aggregation of the crude pigment cannot be decreased by using mechanical shearing strength. The specific surface area of such a crude pigment measured in the same manner as the pigment subjected to the second process, is smaller than that of a corresponding pigment. Moreover, if the crude pigment is directly used as a colorant, since the dispersibility thereof in a dispersion medium is insufficient, it is not useful in practice due to such factors as dullness. These are the conventional prevailing views as to the relationships between the physical characteristics of the crude pigment including the above basic substance and its practical applications.

Note that although it is possible to classify the above basic substance into crude pigment, which is not subjected to the second process, and pigment, which is subjected to both the first and the second processes, in the classification based on the manufacturing process as mentioned above, the basic substance is a pigment although it is subjected only to the first process, in the classification based on whether to satisfy various characteristics required for a colorant, regardless of the classification based on the manufacturing process, if it satisfies such characteristics required for a colorant.

However, such a basic substance has not been obtained before the present invention.

As in the above conventional prevailing view, the basic substance obtained by the conventional methods described in the above publications is in a strong aggregated state, and the specific surface area thereof is 10 m²/g or less.

A powder X-ray diffraction diagram is a graph in which the strength of X-ray diffraction of a sample at each Bragg angle, when the Bragg angle is continuously changed, is consecutively plotted based on zero of the diffraction strength. The absolute strength of the X-ray diffraction at each Bragg angle can be determined based on zero of the diffraction strength in the powder X-ray diffraction diagram.

The inventors of the present invention paid attention to this point, and newly adopted, as a standard for clearly distinguishing a crude pigment, which is not subjected to the above second process in the classification based on the manufacturing process, from pigment, which is subjected to the above second process, the ratio of the absolute strength of the X-ray diffraction at a Bragg angle 2θ=17.5°±0.2° with respect to that at 2θ=18.2°±0.2°. The inventors of the present invention now found that if a colored dispersion medium is prepared from a crude pigment, which is based on the classification of a manufacturing process, including the above conventional basic substance having the ratio of the absolute strength of <1.8/1.0, its color strength and brightness are not satisfactory and is not suitable for use as a colorant.

For the reasons mentioned above, the crude pigment, which is classified based on the manufacturing process, including the basic substance is not conventionally used directly as a colorant, and is further subjected to the second process mentioned above in order to grow crystals of the primary particles to increase the particle size. In this manner, the aggregation of particles may be loosened and pigment having required brightness and color strength is obtained. Also, the flow properties of a colored dispersion medium are improved. These are all described in the above-mentioned publications.

In the conventional technique relating to the above basic substance, since certain properties required for a colorant can be obtained via the second process as mentioned above, there is no positive motivation in this field to develop a crude pigment, in the classification based on the manufacturing process, which is suitable for application as a colorant. Since the development as a colorant has relied upon the factors in the second process mentioned above, studies have not been made of the use of a crude pigment, in the classification based on the manufacturing process, directly as a colorant.

In addition, in the above-mentioned second process, the aggregation of particles is weakened by growing each particle to increase the particle size of the primary particle. However, when high levels of transparency or color strength is required for an objective application, the inherent small particle size of a crude pigment, in the classification based on the manufacturing process, has an advantage in terms of its transparency. Nevertheless, the particle size of the primary particle is increased in exchanged for weakening the cohesive strength in the second process, and this makes it difficult to obtain expected properties as a colorant.

SUMMARY OF THE INVENTION

The inventors of the present invention thought that if the above basic substance is obtained in a weak aggregated state, its specific surface area increases. As a result, the aggregation may be readily loosened by using weaker force to improve its dispersibility, and hence, brightness, etc. If this could be performed, the basic substance, although a crude pigment in the classification based on the manufacturing process, would have characteristics as a colorant.

Accordingly, an object of the present invention is to provide a yellow pigment which can be dispersed using a weak force and can be directly used for applications in which properties, such as brightness and color strength, are important. Another object of the present invention is to provide a yellow pigment which maintains weak aggregated state immediately after a coupling process and includes loosened or easily loosened particle groups.

Also, yet another object of the present invention is to provide a method for manufacturing a yellow pigment having excellent characteristics mentioned above without even carrying out the second process, which is conventionally used for imparting suitable properties as a colorant to the pigment, so that the productivity per unit time of the colorant is improved.

The inventors of the present invention, by fundamental studies on obtaining the above basic substance, which has a weak aggregation state, found that if the basic substance having the specific surface area of 20 m²/g or more is obtained in the above first process, the aggregation state thereof becomes weak, and hence, the color strength and the transparency of a dispersion medium colored by the basic substance having the weak aggregation state are improved even though it should be called a crude pigment in classification based on the manufacturing process.

Also, the inventors of the present invention found that the above basic substance satisfying the condition that the specific surface area and the absolute strength ratio of the X-ray diffraction between two specific Bragg angles are within a specific range, regardless of whether it is classified as pigment or crude pigment in terms of its manufacturing process (i.e., if the above basic substance is prepared via only the first process or both the first process and the second process), and regardless of the classification based on whether it satisfies characteristics required as a colorant (i.e., one which satisfies the characteristics required for a colorant is called a pigment, and one which does not is not called a pigment), has an excellent color strength and transparency and can be called a pigment. The color strength and transparency of a dispersion medium largely changes by the difference in the absolute strength ratio of the basic substance dispersed therein even if the specific surface area thereof is the same.

Moreover, the inventors of the present invention found that the number of steps in the manufacturing process of the above basic substance having the excellent properties may be reduced and the productivity thereof per unit time may be improved since the basic substance, which can be directly applied as a colorant, may be produced via only the above first process without the second process.

In addition, the inventors of the present invention found that the pigment actually obtained via only the first process having the specific surface area of 20 m²/g or greater and a certain range of the absolute strength ratio of the X-ray diffraction between two specific Bragg angles has an excellent color strength and transparency, though smaller in the specific surface area, in comparison with pigment, which is obtained via both the first and the second processes as disclosed in the above-mentioned publications and has the specific surface area of 45 m²/g or greater, under the condition of using the same dispersion medium with the same percentage content. Based on these findings, the inventors of the present invention completed the present invention.

That is, an object of the present invention is to provide a pigment including a chemical compound expressed by the following formula (1), wherein the pigment has the BET specific surface area based on the nitrogen absorption process of 20–100 m²/g, and the ratio of the absolute strength of X-ray diffraction at Bragg angle 2θ=17.5°±0.2° to the absolute strength of X-ray diffraction at Bragg angle 2°=18.2°±0.2° of the pigment in a powder X-ray diffraction diagram using a CuKα characteristic X-ray is smaller than 1.8/1.0.

neously dropping a bisdiazonium salt of 1,2-bis(2-aminophenoxy) ethane and 5-acetoacetylamino-benzimidazolone into an aqueous solution of pH 4–8 to carry out a coupling reaction.

The present invention also provides a method for manufacturing the above pigment including the steps of simultaneously dropping a bisdiazonium salt of 1,2-bis(2-aminophenoxy) ethane and 5-acetoacetylamino-benzimidazolone into an aqueous solution of pH 4–8 to carry out a coupling reaction, increasing the pH of the (1)

In accordance with another aspect of the present invention, the above pigment further includes a surface treatment agent, the amount of the surface treatment agent corresponding to 0.1 to 50% by weight of the pigment.

In yet another aspect of the present invention, the pigment is used for coloring printing ink, paint, or plastic.

In yet another aspect of the present invention, the pigment is used for coloring toners, or color filters.

According to the pigment described above, since it comprises the above basic substance having the BET specific surface area based on the nitrogen absorption method of 20–100 m²/g and the ratio of the absolute strength of the X-ray diffraction between Bragg angles 2θ=17.5°±0.2° and 2θ=18.2°±0.2° smaller than 1.8/1.0, it has a remarkable effect in that it can be used as a colorant having excellent transparency and color strength in comparison with conventional pigments having the absolute strength ratio outside the above range. Also, since no aftertreating process for pigmentization is required for the pigment according to the present invention, the number of steps necessary in the manufacturing process can be reduced and the productivity thereof as pigment can be improved. Moreover, the pigment according to the present invention has a superior effect in that it can be used, although crude pigment in the classification based on the manufacturing process, as pigment having better transparency and color strength as compared with pigment subjected to the aftertreating process. In addition, since the pigment dispersion according to the present invention includes the pigment of the present invention having a weaker aggregated state as compared with that of conventional pigments, it has a remarkable effect of providing excellent transparency and color strength.

The present invention also provides a method for manufacturing the above pigment including the step of simultasolution to be higher than the pH of the solution at the completion of the coupling reaction, and heating the solution to a temperature of 60–95° C.

The present invention also provides a pigment dispersion including the above pigment, and a thermoplastic resin, wherein 0.5–100 parts by weight of the pigment is dispersed in 100 parts by weight of the thermoplastic resin.

In yet another aspect of the present invention, the above pigment dispersion is obtained by a method including a step of flushing the above pigment including water with the thermoplastic resin.

The present invention also provides an electrostatic image developing powder toner comprising the above pigment dispersion

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description. This detailed description of particular preferred embodiments, set out below to enable one to build and use one particular implementation of the invention, is not intended to limit the enumerated claims, but to serve as a particular example thereof.

First, pigment according to an embodiment of the present invention will be explained. The pigment according to an embodiment of the present invention includes 2,2'-[1,2-ethanediylbis(oxy 2,1-phenyleneazo)] bis[N-(2,3-dihydro-2-oxo-1H-benzimidazole-5-yl)-3-oxo-butaneamide, which is the above-mentioned basic substance. That is, in terms of chemical composition, this is the same as C.I. Pigment Yellow 180.

The pigment according to an embodiment of the present invention is defined by the BET specific surface area based on the nitrogen absorption process, and the absolute strength ratio of X-ray diffraction at two specific Bragg angles in a powder X-ray diffraction diagram using a CuKα characteristic X-ray.

The pigment according to an embodiment of the present invention can be distinguished from conventional crude pigment in terms of its large specific surface area derived from its weak aggregated state. In addition, the pigment according to an embodiment of the present invention can be distinguished from conventional crude pigment in terms of its absolute strength ratio (h1/h2) being smaller than 1.8/1.0. As mentioned above, the absolute strength ratio (h1/h2) means the ratio of the absolute strength (h1) of X-ray diffraction at Bragg angle 2θ=17.5°±0.2° to the absolute strength (h2) of X-ray diffraction at Bragg angle 2θ=18.2°±0.2° in the powder X-ray diffraction diagram using the CuKα characteristic X-ray.

The BET specific surface area based on the nitrogen absorption process used in the present invention is measured in accordance with JIS Z 8830-1990 (i.e., a specific surface area measuring method for powder using gas adsorption process). The conditions used for the measurement described in the accompanying document 2 of JIS are: pretreatment of sample; temperature of 120° C. for 20 minutes; sample weight of 0.25 g; measuring method for adsorption amount of one point method; and nitrogen partial pressure of 0.3. Micro sorp 4232 II (a product of Micro.Data Co., Ltd.) is a specific surface area measuring device which conforms with the conditions.

The BET specific surface area based on the nitrogen absorption process of the pigment according to an embodiment of the present invention is in a range between about 20–100 $m^2/g$, preferably in a range between about 30–85 $m^2/g$.

The measurement of the X-ray diffraction strength in the present invention is carried out in accordance with JIS K 0131-1996, which defines the general X-ray diffraction analysis rules, and is obtained from a powder X-ray diffraction diagram in which X-ray diffraction peaks are recorded using CuKα characteristic X-ray (i.e., wavelength of 0.1541 nanometer).

The term "absolute strength of X-ray diffraction" expresses the strength of X-ray diffraction of a matter at an arbitrary Bragg angle when the Bragg angle is continuously changed based on zero of the diffraction strength in a powder X-ray diffraction diagram.

In the powder X-ray diffraction diagram, the half-width of a diffraction peak of a crude pigment tends to increase, more or less, as compared with that of a pigment, in comparison with the diffraction peak generated at the same Bragg angle, since the crystallinity of a conventional crude pigment is lower than that of a pigment.

The inventors of the present invention found the Bragg angles at which the same tendency as mentioned above appears for the above basic substance is most conspicuous. More specifically, although a diffraction peak generated at Bragg angle 2θ=17.5°±0.2° and an adjacent diffraction peak generated at 2θ=19.3°±0.2° can be distinguished as two completely separated peaks in a conventional pigment including the above basic substance, the base portions of the corresponding two peaks are superimposed and cannot be clearly distinguished in the pigment according to an embodiment of the present invention. That is, in the pigment according to an embodiment of the present invention, since the base portion at the higher angle side of the diffraction peak at Bragg angle 2θ=17.5°±0.2° and the base portion at the lower angle side of the adjacent diffraction peak at 2θ=19.3°±0.2° are superimposed and form a trough of the absolute strength. In the X-ray diffraction diagram of the above mentioned basic substance, the bottom portion of the trough appears at Bragg angle 2θ=18.2°±0.2° and it has a specific absolute strength in the X-ray diffraction (refer to diagrams).

The inventors of the present invention, in considerations of the above observation, adapted the ratio (h1/h2) of the absolute strength (h1) of X-ray diffraction at Bragg angle 2θ=17.5°±0.2° to the absolute strength (h2) at 2θ=18.2°±0.2° as a criterion for distinguishing crude pigment from pigment as to classification based on manufacturing process and also as a criterion for distinguishing crude pigment from pigment as to classification based on the degree of satisfying properties required as a colorant. In the pigment according to an embodiment of the present invention, the ratio (h1/h2) of the absolute strength (h1) at Bragg angle 2θ=17.5°±0.2° and the absolute strength (h2) at Bragg angle 2θ=18.2°±0.2° of X-ray diffraction is <1.8/1.0.

The aggregation strength of pigment according to the present invention, in its powdered state, is considerably less than that of a conventional crude pigment, and hence, has a characteristic in that it can be separated by weaker force. As a result, neither an aftertreating process nor a pigmentization process (i.e., the above-mentioned second process), which is usually carried out in order to readily separate the aggregation of a crude pigment, is not necessary for the pigment according to an embodiment of the present invention. Thus, although it is a crude pigment in terms of its manufacturing process, the pigment according to an embodiment of the present invention can be suitably used as a pigment.

The pigment according to the present invention explained above can be prepared by using a method in which fine particles are obtained immediately after a coupling process is maintained in a weak aggregated state. More specifically, as an example of the method for manufacturing pigment according to an embodiment of the present invention having a structure in which bisdiazonium salt of 1,2-bis(2-aminophenoxy) ethane (hereinafter referred to as a bisdiazonium salt) is used as a diazo component and 5-acetoacetylamino-benzimidazolone (hereinafter referred to as an imidazolone compound) is used as a coupler component and both are subjected to a coupling process, one in which the bisdiazonium salt and the imidazolone compound are simultaneously dropped into an aqueous solution having pH of 4–8 to carry out a coupling reaction is included.

In this coupling reaction, 1,2-bis(2-aminophenoxy) ethane, which is a raw material, is usually converted to a bisdiazonium salt solution in advance, and then the reaction is carried out.

The bisdiazonium salt may be obtained by, for instance, the reaction of 1, 2-bis(2-aminophenoxy) ethane, hydrochloric acid, and sodium nitrite solution.

On the other hand, in the coupling reaction, the imidazolone compound is usually converted to a solution in advance and then the reaction is carried out. The solution is usually an alkaline aqueous solution.

An objective crude pigment may be obtained by dropping the bisdiazonium salt and the imidazolone compound, with a theoretical molar ratio of 1:2, into the solution having a pH between 4–8 at the same time to carry out a coupling reaction.

The above-mentioned coupling reaction, more specifically, can be carried out by simultaneously dropping the bisdiazonium salt and the imidazolone compound to an aqueous solution having a pH between 4–8, more preferably a pH between 5–7, at a temperature of 5–30° C., and then increasing the temperature to 60–95° C. and maintaining the temperature for about 1–5 hours. According to an embodiment of the present invention, it is preferable that the addition of the bisdiazonium salt solution and the imidazolone compound solution to the above mentioned aqueous solution having a pH of 4–8 be completed within a period of 1–12 hours, more preferably within a period of 2–7 hours.

It is preferable that a buffering agent for maintaining a constant pH and a coupling agent, the amount of which corresponds to 0.1–50% by weight, more preferably 1–30% by weight, of untreated pigment, be present in the aqueous solution of pH 4–8 into which the bisdiazonium salt solution and the imidazolone compound solution are dropped. Examples of the coupling agent include, for instance, conventionally known additives, such as rosins and surfactants. Among these coupling agents, when a surfactant is used, yield of the product may be increased due to improvement in the rate of coupling reaction, the hue may be improved, and the dispersibility of the pigment per se, which is normally obtained in a cohesive or flocculated state, may be enhanced. Also, when a rosin is used, the transparency of the product may be improved and the flocculation of pigment may be prevented. The types and the amount of the buffer agent which may be used in accordance with the present invention are not particularly limited, and for instance, an agent such as sodium acetate may be suitably used as the buffer agent.

When a coupling agent is also used in the coupling reaction as mentioned above, pigment is obtained which corresponds to untreated pigment to which the coupling agent is attached in an amount corresponding to 0.1~50% by weight of the pigment.

According to the present invention, the amount (mol %) of the imidazolone compound with respect to one mol of the bisdiazonium salt is not particularly limited. It is preferable that 1.995–2.300 mol of the imidazolone compound be present with respect to one mol of the bisdiazonium salt.

After the coupling reaction, as mentioned above, it is preferable that the reaction solution be subjected directly to a heating process at 60–95° C. since the number of steps required for the preparation of products may be reduced in comparison with a conventional method in which the reaction solution is filtered to remove liquid medium, dispersed in excessive amount of different liquid medium, such as water, methanol, or dimethyl formamide, and is then subjected to a lengthy heating process at 80–150° C. for 1–10 hours to obtain a pigment. That is, by the heat treatment used in the present invention as explained above, the reaction solution after the completion of the coupling reaction need not be subjected to a tedious aftertreating process or a pigmentization process (i.e., the above-mentioned second process), which are said to be essential in conventional processes. Also, the specific surface area of the pigment may be increased if the pH of the reaction solution is adjusted to be higher than the pH at the completion of the coupling reaction, preferably pH 10 or higher, and is then subjected to a heating process at 60–95° C.

It is not preferable, in terms of productivity, that the reaction solution including the pigment be filtered and subjected to an aftertreating process using a liquid medium having chemical compositions different from those present in the reaction solution in order to obtain a pigment.

The pigment according to an embodiment of the present invention thus obtained may be used in the same manner as conventional azo pigment in a wet state after the above mentioned reaction, in a powder state, in a wet cake state, or in a slurry state. Among the pigment of these various states, the wet state pigments are generally called water-containing pigment in this specification.

The compositional ratio between water and pigment in the water-containing pigment is not particularly limited. However, assuming the total amount of both is 100% by weight, the amount of pigment is in the range between 10–90% by weight, and preferably in the range between 20–50% by weight if flushing, which will be described later, is carried out.

The pigment, which is obtained as mentioned above and can be expressed by the above formula (1), has the BET specific surface area based on nitrogen absorption of between 20–100 $m^2/g$. Also, the pigment has the ratio (h1/h2) of the absolute strength (h1) at Bragg angle $2\theta=17.5°±0.2°$ to the absolute strength (h2) at Bragg angle $2\theta=18.2°±0.2°$ of X-ray diffraction less than 1.8/1.0.

It is possible to provide a pigment dispersion by combining the pigment according to an embodiment of the present invention with a thermoplastic resin. The pigment dispersion includes, based on its properties, a solid pigment dispersion and a liquid pigment dispersion. The pigment according to an embodiment of the present invention can provide a pigment dispersion by being dispersed in thermoplastic resin for dispersing pigment, such as a vehicle for printing ink and a vehicle for paint. These thermoplastic resins may be produced by using any known methods.

The pigment dispersion according to the present invention includes not only pigment dispersion consisting of azo pigment and a thermoplastic resin, for instance, master batch for coloring plastics and master batch for color toner but also azo pigment dispersion to which resin, such as a thermosetting resin, solvent, and other additives are added, for instance, ink for lithography, gravure ink, paints, plastics, color toner, and resist ink for producing color filter.

The compositional ratio of the pigment and the thermoplastic resin is not particularly limited. For example, the amount of pigment can be 0.5–100 parts by weight with respect to 100 parts by weight of a thermoplastic resin. In the case of the above mentioned master batch, the amount of pigment is generally 50–80 parts by weight with respect to 100 parts by weight of the thermoplastic resin.

When the pigment dispersion of the present invention is prepared, it is possible to mix pigment powder with a solid thermoplastic synthetic resin at a temperature higher than the melting temperature of the resin.

In general, the water-containing pigment has an advantage in applications in which its transparency and color strength are important since the aggregation among the pigment particles which occur during a drying process is prevented and hence the degree of aggregation is less than that in the particle state. Since water present between pigment particles enhances the aggregation among the pigment particles during a drying process due to its surface tension, a pigment dispersion which is superior in terms of transparency and color strength can be obtained by avoiding such a situation, by mixing water-containing pigment with a liquid thermoplastic resin or an organic solvent containing a thermoplastic resin at a temperature less than the boiling point of water or the solvent so that water present on the surface of the pigment particle can be replaced with the resin or the organic solvent. In such a case, water or the organic solvent may be removed at an appropriate time if necessary.

According to an embodiment of the present invention, if a flushing process is carried out using the water-containing pigment and a thermoplastic resin as essential components, a pigment dispersion, which is excellent in its dispersibility and transparency, can be obtained as compared with the case where pigment powder is dispersed in a thermoplastic resin.

Here, the term flushing process indicates a process in which a water-containing pigment is mixed with a thermoplastic resin as essential components, and water is removed after the pigment is converted to an organic phase from an aqueous phase. Note that the removal of water can be carried out by combining a decantation process and a heat-vacuum aspiration process.

Also, although the pigment according to an embodiment of the present invention can be dispersed directly in a thermoplastic resin, the pigment may also be dispersed in vehicle for printing ink or vehicle for paints containing a thermoplastic resin as an essential component.

Examples of the thermoplastic resin can be used in the present invention as a dispersing resin include, for example, a polyester resin, a polyamide resin, a styrene resin, an acryl resin, a polyolefin, polyalkylene terephthalate, and a polyvinyl chloride resin.

Vehicle for lithography printing ink, for instance, may be produced from 20–50% by weight of resin, such as a rosin denatured phenol resin, a petroleum resin, and an alkyd resin, 0–30% by weight of animal or vegetable oil, such as linseed oil, tung oil, and soybean oil, 10–60% by weight of solvent, such as n-paraffin, isoparaffin, naphthene, α-olefin, and aromatic, and a few percent by weight of additives, such as a solubilizing agent, and a gelling agent.

Also, vehicle for gravure printing ink or vehicle for flexographic ink may be produced from, for instance, 10–50% by weight of at least one of resins selected from rosins, maleate resin, polyamide resin, vinyl resin, cyclized rubber, chlorinated rubber, ethylene-vinyl acetate copolymer resin, urethane resin, polyester resin, alkyd resin, nitrocellulose, cellulose acetate, etc., and 30–80% by weight of solvent, such as alcohol, toluene, n-hexane, ethyl acetate, butyl acetate, cellosolve, and butyl cellosolve.

In addition, vehicle for paints may be produced from, for instance, 20–80% by weight of resin, such as an alkyd resin, an epoxy resin, an acryl resin, a polyurethane resin, a polyester resin, a melamine resin, an urea resin, an aqueous resin, and 10–60% by weight of solvent, such as hydrocarbon, alcohol, ketone, and water.

When a colored product is produced, for instance, polyolefin, such as polyethylene and polypropylene, and a thermoplastic resin (plastic), such as polyvinyl chloride resin, which can be used for thermoforming process, such as injection molding or press molding, are used as a dispersion resin. The pigment dispersion according to the present invention obtained by using these resins may be formed into a required shape to produce a colored product.

When an electrostatic image developing toner is produced, a thermoplastic resin capable of forming a solid coating at ordinary temperature, such as a polyester resin, an epoxy resin, a polyamide resin, a styrene resin, and an acryl resin, is used as a dispersion resin. The pigment dispersion according to the present invention obtained by using these resins, which is in a solid form at ordinary temperature, can be ground and separated into a required particle size to be used as an electrostatic image developing toner, which will be described later in detail.

These pigment dispersion may be mixed, if necessary, with other resins, rubbers, additives, pigments, and colorants to be finally produced and used as printing ink, paints, molded products (plastic), toners, color filters, and so forth.

Unlimited examples of dispersing devices used for dispersing the pigment into a thermoplastic synthetic resin when a pigment dispersion is prepared, include known dispersing devices, such as a disper, a homomixer, a bead mill, a two-piece roller mill, a three-piece roller mill, an ordinary and applied pressure kneader, and an ultrasonic dispersing device.

Conditions used for a dispersing process depends on a dispersion medium and a dispersing device used. Accordingly, the temperature and time period for the dispersion process are not particularly limited. However, in general, the dispersion temperature is between room temperature and 300° C., preferably between room temperature and 240° C., and the dispersion period is one minute to 120 hours, and preferably three minutes to 7 hours.

The proportion of the pigment in the pigment dispersion is not particularly limited, and generally is in a range between a few percent by weight and 30% by weight. However, this may vary depending on application, and for instance, 13–20% by weight in lithography ink, 3–20% by weight in gravure ink, 0.3–15% by weight in paint, 0.01–1% by weight in coloring plastic, 4–10% by weight in toner, and 4–7% by weight in resist ink in a color filter application.

As explained above, the azo pigment dispersion according to an embodiment of the present invention can be used in any of known applications. However, in addition to such conventional applications, the azo pigment dispersion according to the present invention is also suitably applied to a use in which it is subjected to a higher temperature, such as for the case of a colored product made of a high-melting point thermoplastic resin, such as polyphenylene sulfide and polybutylene terephthalate, or the case of an electrostatic image developing toner which is produced via a heat setting fixation process.

The pigment dispersion according to an embodiment invention may also be used as, for instance, paste color or dry color. When the pigment dispersion is directly used as a coloring master batch for uncolored thermoplastic resin, which is used as a binder resin for the above mentioned colored product or the electrostatic image developing toner, a product or toner which is more uniformly colored in a shorter period of time can be obtained as compared with the case where it is directly mixed with the whole quantity of a thermoplastic resin.

When a pigment dispersion containing the pigment of the present invention and a thermoplastic resin is prepared, use of the above-mentioned flushing process is particularly effective in order to obtain a maximum degree of its performance.

In particular, for an application as pigment which requires transparency, a pigment dispersion having better quality may be obtained when a water-containing pigment and a thermoplastic resin are subjected to a flushing process as compared with the case where powder pigment, which tends to cause strong aggregation among pigment particles during a drying process and whose dispersibility in a thermoplastic resin tends to be reduced, is mixed with a thermoplastic resin.

The characteristic of a pigment dispersion having high transparency according to an embodiment of the present invention leads to an effect of obtaining a clear image having excellent coloring property in the field of full color toner in which a color image is produced by superimposing each of the color toner.

The electrostatic image developing toner including the pigment according to an embodiment of the present invention may be used as magnetic one-component color toner which includes a magnetic substance in the toner (i.e., magnetic one-component developing color toner), non-magnetic one-component color toner which does not include a magnetic substance (i.e., non-magnetic one-component developing color toner), or two-component color developing color toner which is mixed with a carrier, (two-component developing color toner).

The magnetic one-component color toner may be prepared from, similar to conventional toner, for instance, a colorant, a binding resin, magnetic powder, a charge controlling agent (CCA), and other additives, such as a mold releasing agent.

The amount of pigment contained in an electrostatic image developing toner including the pigment of the present invention is not particularly limited. However, it is preferable that 0.5–25 parts by weight of the pigment be present with respect to 100 parts by weight of the binding resin. It is more preferable that 2–10 parts by weight of pigment be present with respect to 100 parts by weight of the binding resin in order to make conspicuous the electrification property the colorant possesses.

As a binding resin used for an electrostatic image developing toner including the pigment according to the present invention, any known thermoplastic resins mentioned above can be utilized including synthetic resins, natural resins, natural rubbers, synthetic rubbers, and synthetic waxes, which exhibit adhesive properties under applied heat or pressure condition.

Examples of the synthetic waxes, which may be used for an electrostatic image developing toner including the pigment according to the present invention, include, for instance, chlorinated paraffin wax, paraffin wax, polypropylene wax, and PVC.

Also, examples of natural resins, use of which is effective in the present invention, include, for instance, balsam resin, rosin, shellac, and coval. These resins may be denatured with one or more of vinyl resin, acryl resin, alkyd resin, phenol resin, which will be described later.

Also, examples of the natural or synthetic rubber material include, for instance, natural rubber, chlorinated rubber, cyclized rubber, polyisobutylene rubber, ethylene-propylene rubber, polybutadiene rubber, butyl rubber, styrene-butadiene rubber, acrylonitrile-butadinene rubber, chloroprene rubber, silicone rubber, and fluorinated rubber.

The binder resin used for an electrostatic image developing toner including the pigment according to the present invention is not limited to the ones mentioned above, and two or more of binding resin components may be mixed in an appropriate manner.

As a binding resin, use of one whose glass transition temperature is 45–85° C. measured by a differential scanning calorimetry (DSC), and whose temperature at which its melt viscosity becomes $1\times10^5$ poise is 95–170° C. measured by a constant load extrusion tubule type rheometer is preferable (measurement conditions: elevated flow tester; Shimadzu flow tester CFT-C type: piston cross-sectional area of 1 $cm^2$, cylinder pressure of 0.98 MPa, die length of 1 mm, die hole size of 1 mm, measurement starting temperature of 50° C., temperature increase rate of 6° C./min, and sample weight of 1.5 g).

Among them, a styrene resin, an acryl resin, a polyester resin, and an epoxy resin can be used advantageously in terms of their transparency and the hue of toner. Use of a polyester resin is particularly preferable.

Magnetic powder which can be used in an electrostatic image developing toner including the pigment according to the present invention is not limited. It is preferable, however, to use one whose color tends not be reflected on the color to be produced. Examples of such include, for instance, iron oxide, such as γ-iron oxide, yellow γ-iron oxide, and ferrite; metals, such as iron, cobalt, and nickel or alloys of these metals with aluminum, cobalt, copper, lead, magnesium, tin, and zinc; organic magnetic substances, such as poly-1,4-bis (2, 2, 6, 6-tetramethyl-4-oxyl-4-piperidyl-1-oxyl)butadiene porphyrin metal complex, and mixtures thereof. Among these, use of yellow γ-iron oxide is preferable in terms of its hue.

The average particle size of the magnetic powder may be in the range between 0.1 and 1 μm, preferably in the range between 0.1 and 0.5 μm, from the viewpoint of electrification stability and hue. Also, the amount of the magnetic powder contained in toner can be in a range between 30–150% by weight with respect to 100 parts by weight of a binding resin. It is preferable that the amount of the magnetic powder be in a range between 40–120% by weight with respect to 100 parts by weight of the binding powder from the viewpoint of electrification stability and hue.

If necessary, various plasticizers, resistance regulating agents, and charge controlling agents may be added to an electrification developing toner including the pigment according to an embodiment of the present invention in order to adjust thermal, electric, and physical properties of the toner.

Examples of the plasticizer include, for instance, dibutyl phthalate, dioctyl phthalate. Examples of resistance regulating agent include, for instance, tin oxide, lead oxide, and antimony oxide. Examples of the charge controlling agent include, for instance, quaternary ammonium salt, pyridinium salt, and metal complex die.

Also, in the electrostatic image developing toner containing the pigment according to an embodiment of the present invention, it is possible to add, after the production of toner particles, fine particles of $TiO_2$, $Al_2O_3$, $SiO_2$, etc., to improve flow properties of the toner, or zinc stearate or phthalate to prevent deterioration of a sensitizing material.

No special method is required for the production of the electrostatic image developing toner including the pigment according to an embodiment of the present invention, and it can be produced by using a method which is employed quite commonly in the field. For example, each of the above-mentioned component may be mixed by using a kneading means, such as an extruder, a 2 roll mill or 3 roll mill, or a heating kneader, to obtain a mixture including a pigment dispersion of the present invention, and this may be ground using a grinding machine, such as a jet mill, after cooling. Then, the ground material can be air classified to obtain an objective color toner powder according to an embodiment of the present invention.

Also, if a master batch of the pigment dispersion including a high concentration of the pigment according to an embodiment of the present invention is prepared in advance using a binding resin for toner as a thermoplastic resin, and this is mixed and diluted with the same or a different binding resin so as to obtain a pigment dispersion according to an embodiment of the present invention having a predetermined pigment concentration, toner that is excellent in image transparency can be obtained as compared with the case where a master batch is not used in the production.

Moreover, by combining the above-mentioned flushing process with the master batch method, it becomes possible to obtain toner from which image having a most excellent transparency, color development, and brightness property is produced, in comparison with the other methods where the same resin is used.

Note that the color toner including the pigment of the present invention is a particle type dispersion in which the pigment is dispersed in the above-mentioned binding resin and the average particle size of the toner particle is preferably in a range between 3–5 $\mu$m.

Also, when used as a two-component color developing color toner, the same colorant, the binding resin, and the additives used for the one-component color magnetic toner may also be employed.

Moreover, examples of a carrier that can be used in an electrostatic image developing toner including the pigment according to an embodiment of the present invention include, for instance, iron powder, nickel powder, ferrite powder, glass beads, and coated material of these powders and beads with styrene-acrylic ester copolymer, styrene-methacrylate copolymer, acrylic ester polymer, methacrylate ester polymer, silicone resin, polyamide resin or mixture thereof. It is preferable that the particle size thereof be in a range between 50–300 $\mu$m.

The two-component color developing color toner may be obtained by friction mixing these carrier particles with color toner including the pigment according to an embodiment of the present invention in a horizontal cylinder or a V-shape container-rotation type mixer.

Also, the mixing ratio of the carrier and the color toner is usually 2–10 parts by weight, preferably 4–6 parts by weight, of color toner with respect to 100 parts by weight of the carrier in order to obtain an appropriate image concentration.

EXAMPLES

Hereinafter, the present invention will be described in detail with reference to Preparation Examples, Examples, and Comparative Examples. Note that "parts" and "%" used in the following indicate "parts by weight" and "% by weight", respectively, unless otherwise indicated.

Preparation Example 1

After 1,2-bis(2-aminophenoxy)-ethane (45 parts) was dispersed in water (650 parts), 35% hydrochloric acid (107.7 parts) was added. Then, 40% sodium nitrite solution (67.4 parts) was dropped to the dispersion to produce a diazo component while maintaining the temperature of the solution at 5° C. or below by adding ice. On the other hand, 5-acetoacetylamino-benzimidazolone (93 parts) was dispersed in water (675 parts), and 25% sodium hydroxide aqueous solution (119 parts) was added to the dispersion to obtain a coupler component. Then, water and ice were added to the diazo component and the coupler component to adjust the amount thereof to 1300 parts and 900 parts, respectively.

Then, 90% acetic acid (6 parts) and polyoxyethylene lauryl ether (13.5 parts) were added to water (1300 parts), and the temperature and pH of the solution were adjusted to be 20° C. and 6.0, respectively. After the coupler component prepared as mentioned above was dropped into the acetic acid solution and pH of the solution was adjusted to 6.0, the diazo component was dropped into the solution at a constant rate.

At the same time as the diazo solution was dropped into the solution, the coupler component was also dropped into the solution so that excess amount of diazonium salt would not be present in the acetic acid solution, and the coupling reaction was carried out while maintaining the pH of the acetic acid solution at 6.0 by adjusting the dropping rate of the coupler component. The temperature and the pH of the solution were maintained at 20° C. and 6.0, respectively, during the coupling reaction by adding ice or 5% sodium hydroxide solution, and the reaction was completed after about three hours. Then, the solution was heated to 90° C. and the temperature was maintained for one hour.

After this, the precipitate was filtered and washed with water to obtain water-containing pigment (30% pigment content), and the pigment was dried at 70° C. Solid matter obtained was ground using a blender, and powder of disazo yellow pigment according to an embodiment of the present invention containing compound expressed by the formula (1) was obtained.

The BET specific surface area based on nitrogen absorption process, which was measured by using Micro sorp 4232 II (a product of Micro-Data Co. Ltd.), of the obtained pigment powder was 35 m$^2$/g.

Figure 1:
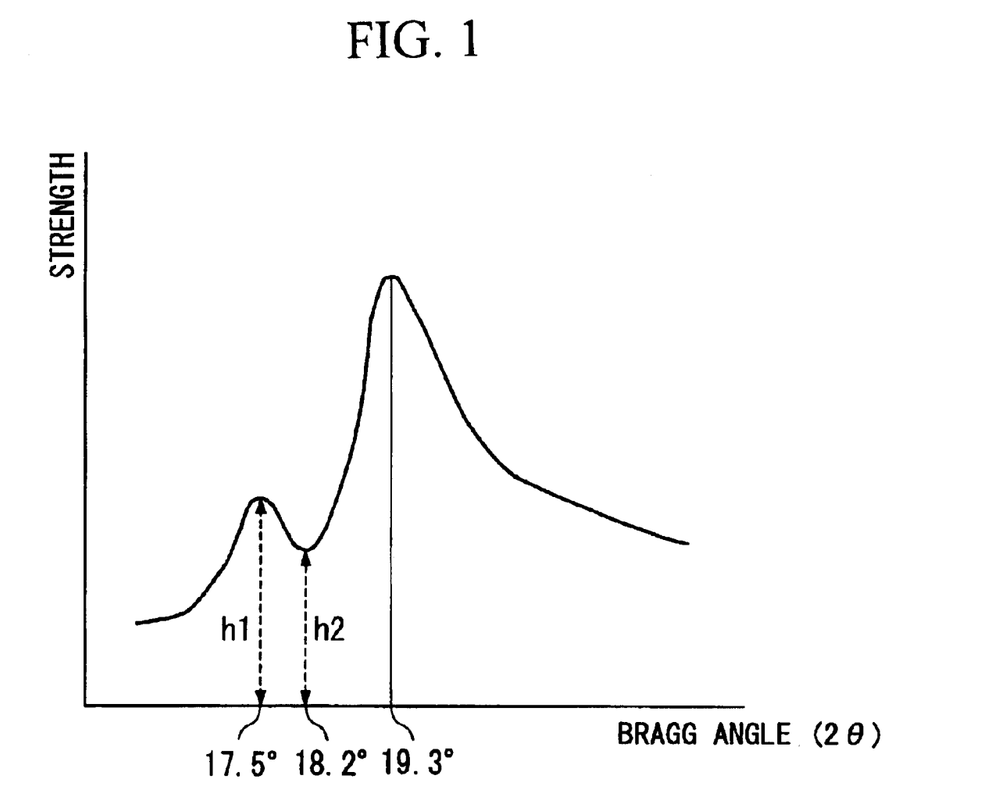
FIG. 1 is a graph for explaining the method to obtain the ratio between the absolute strength (h1) of the X-ray diffraction at Bragg angle 2θ=17.5°±0.2° and the absolute strength (h2) of the X-ray diffraction at Bragg angle 2θ=18.2°±0.2° in the powder X-ray diffraction diagram based on CuKα characteristic X-ray.
Figure 2:
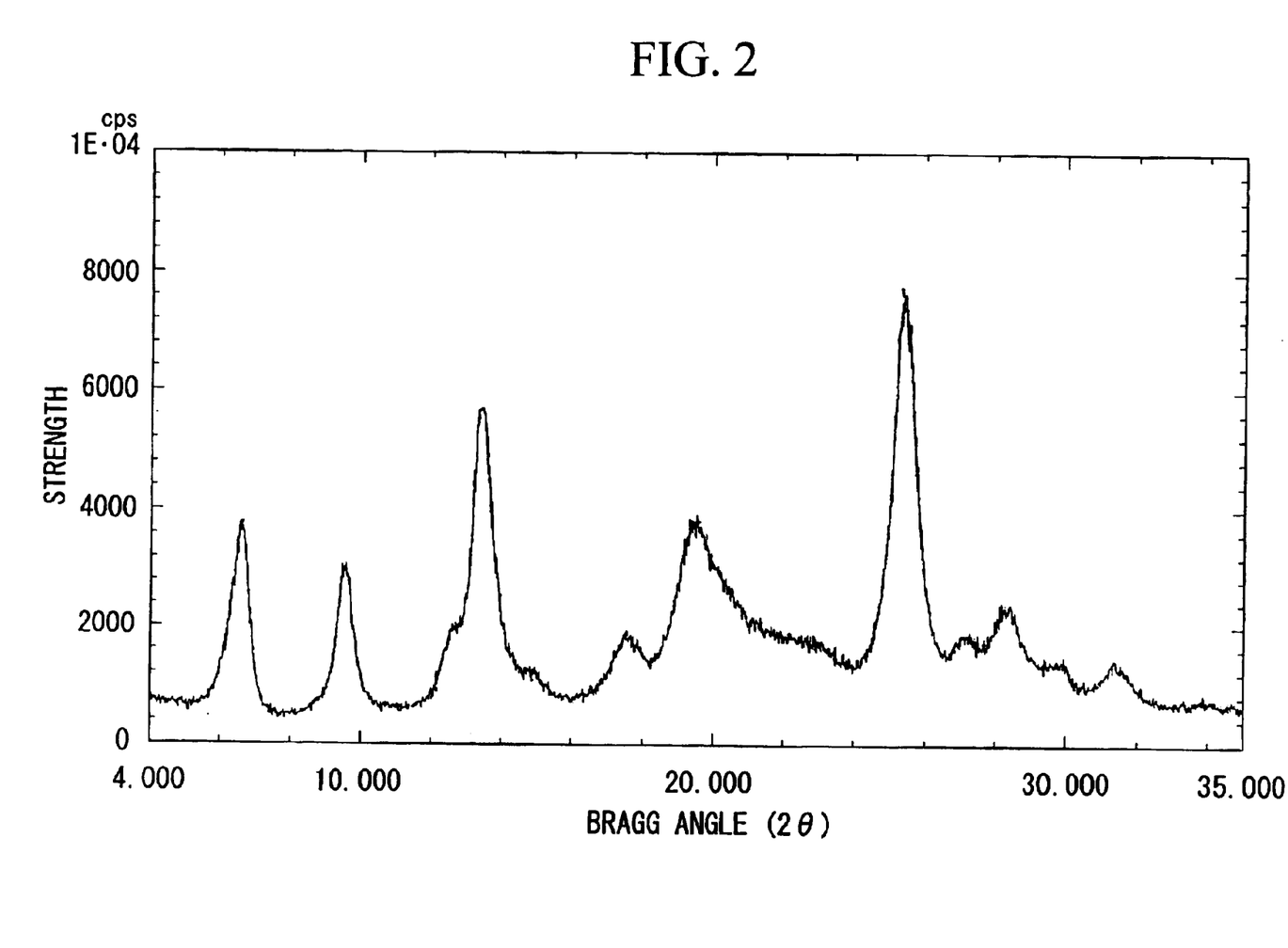
FIG. 2 shows a powder X-ray diffraction diagram of pigment prepared in Preparation Example 1.
Figure 3:
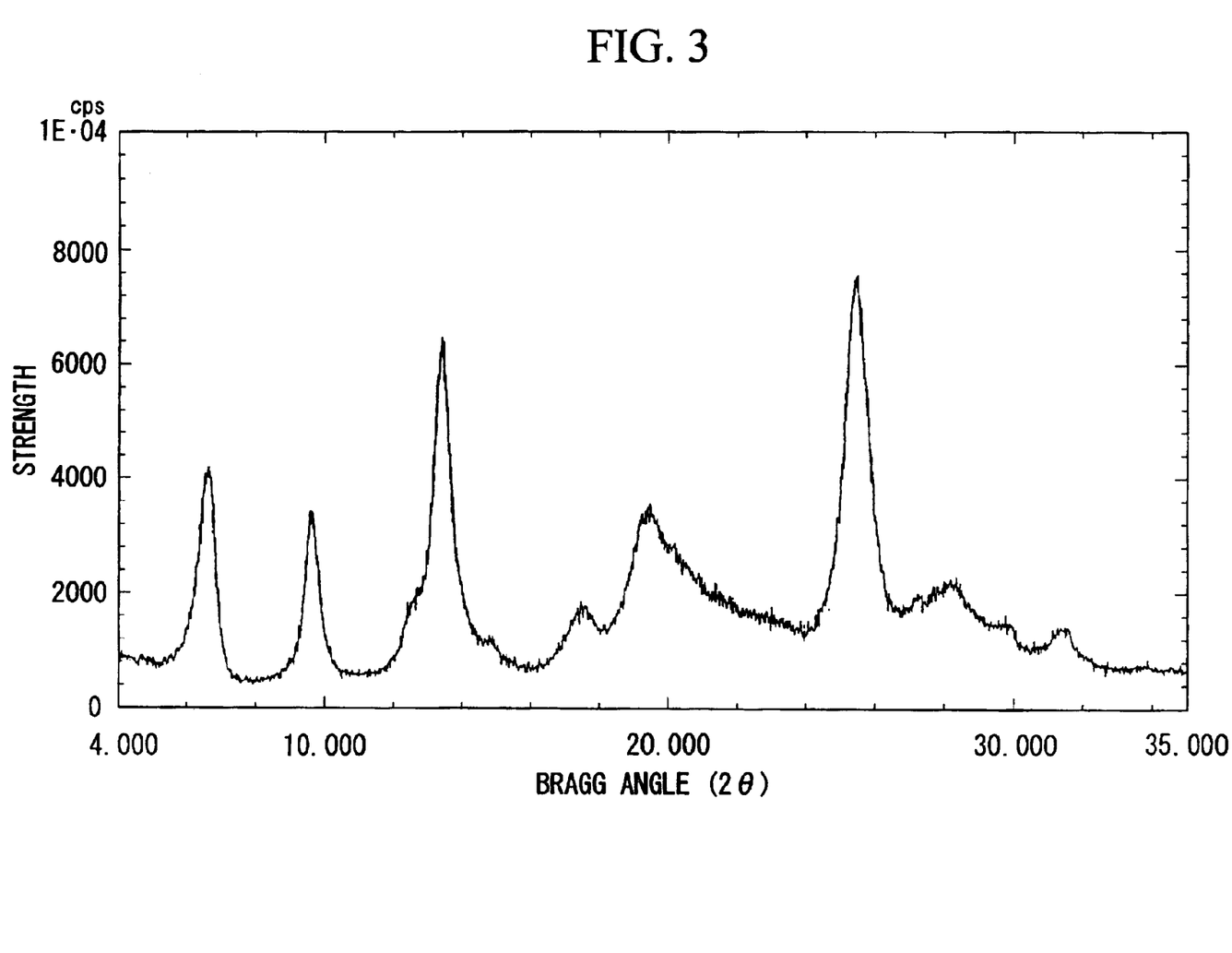
FIG. 3 shows a powder X-ray diffraction diagram of pigment prepared in Preparation Example 2.
Figure 4:
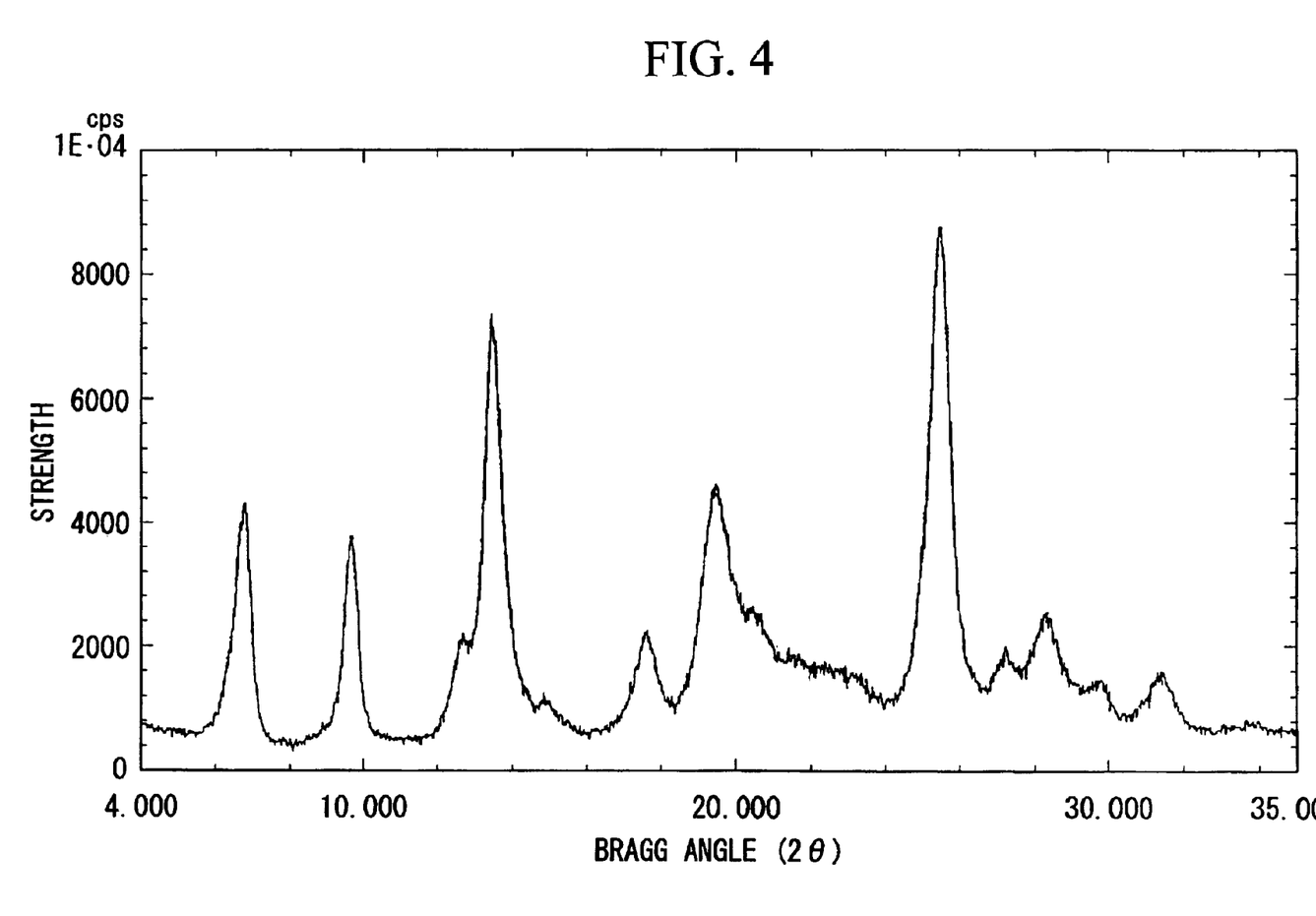
FIG. 4 shows a powder X-ray diffraction diagram of pigment prepared in Preparation Example 5.
Figure 5:
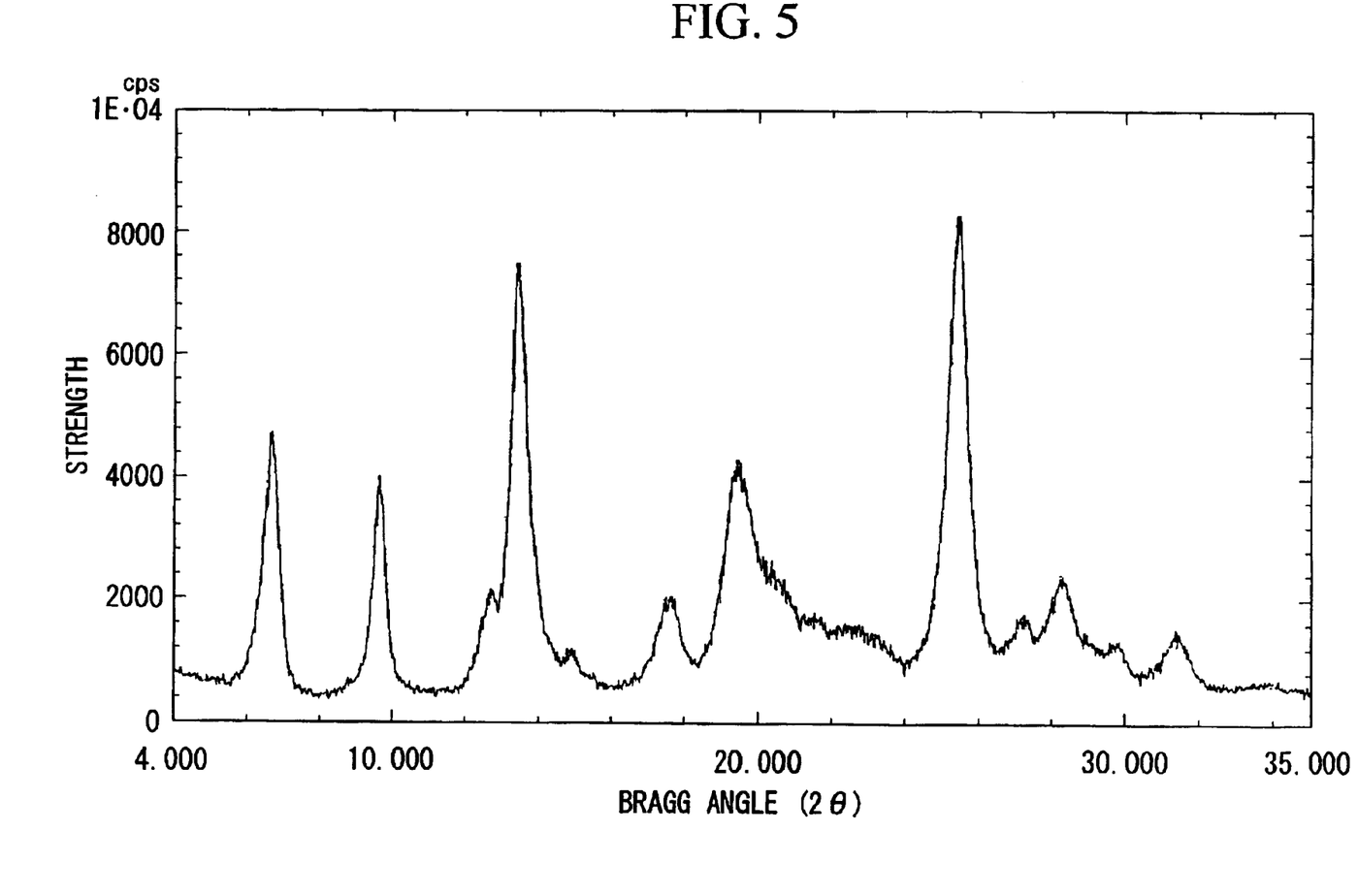
FIG. 5 shows a powder X-ray diffraction diagram of a commercially available powder pigment yellow 180 ("Novoperm Yellow P-HG", a product of Clariant Japan Co., Ltd.)
Figure 6:
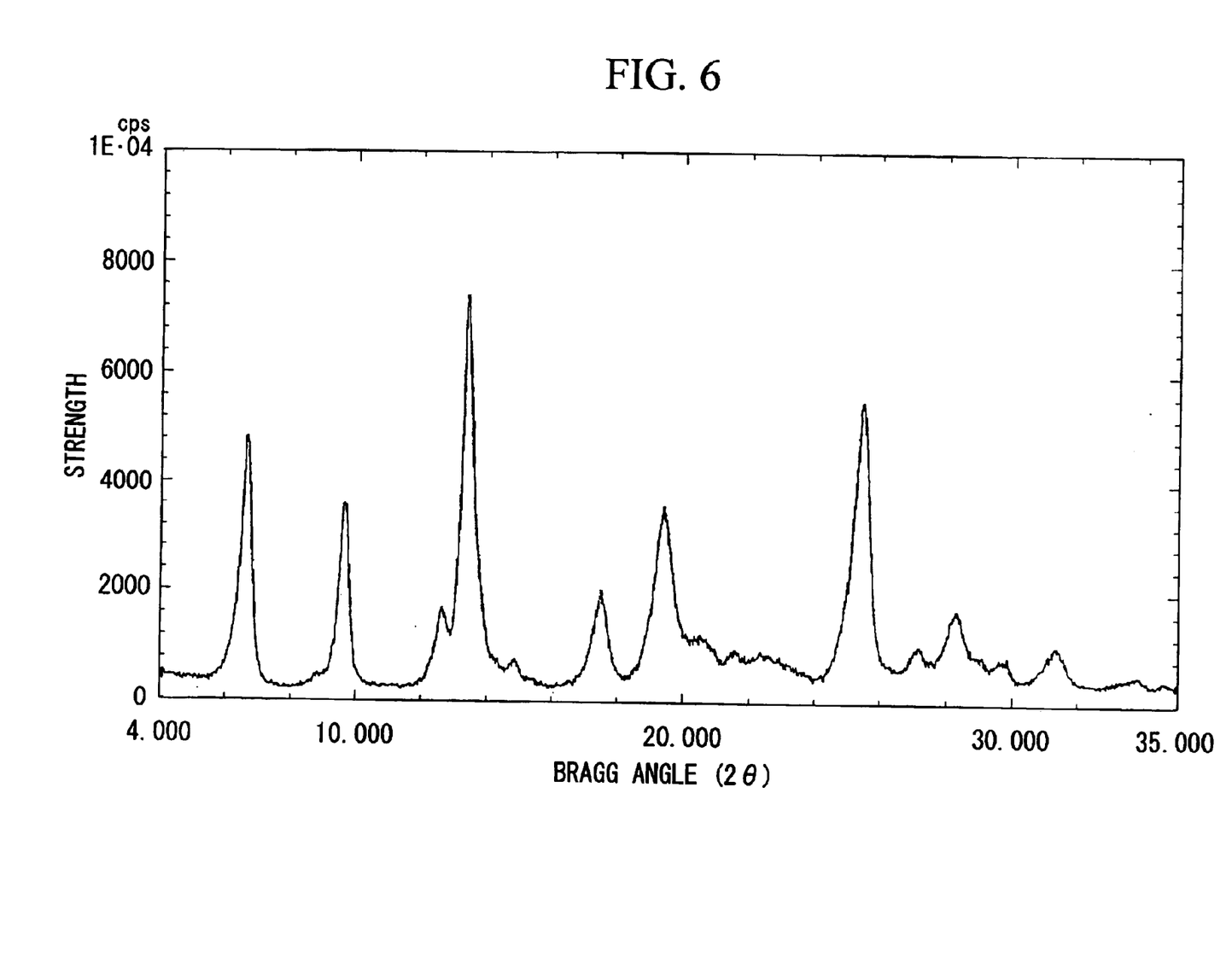
FIG. 6 shows a powder X-ray diffraction diagram of a commercially available powder pigment yellow 180 ("Toner Yellow HG VP2155", a product of Clariant Japan Co., Ltd.).

A powder X-ray diffraction diagram using the CuK$\alpha$ characteristic X-ray of the pigment was obtained, and in accordance with the graph shown in FIG. 1, the height of a peak at Bragg angle 2$\theta$=17.5°±0.2° was measured from the base line. This was used as the absolute strength (h1). Similarly, the distance between the trough at Bragg angle 2$\theta$=18.2°±0.2° and the base line was measured, and this was used as the absolute strength (h2). Note that the highest absolute strength in the range of Bragg angle 2$\theta$=17.5°±0.2° was selected as h1, and the lowest absolute strength in the range of Bragg angle 2$\theta$=18.2°±0.2° was selected as h2. Using thus obtained h1 and h2, the absolute strength ratio (h1/h2) was calculated (the same method was adopted for each of the following Preparation Examples).

As a result, the ratio (h1/h2) of the absolute strength (h1) of the X-ray diffraction at Bragg angle 2$\theta$=17.5°±0.2° to the absolute strength (h2) of the X-ray diffraction at Bragg angle 2$\theta$=18.2°±0.2° of the pigment in the powder X-ray diffraction diagram using the CuK$\alpha$ characteristic X-ray was found to be 1.44/1.00.

Preparation Example 2

A water-containing pigment (28% pigment content) and a disazo yellow pigment powder according to an embodiment of the present was obtained by using the same method as in Preparation Example 1 except that the amount of 5-acetoacetylamino-benzimidazolone used was changed to 90 parts from 93 parts, polyoxyethylene lauryl ether was not added to the acetic acid solution, and the pH of the solution was adjusted to be 12 using sodium hydroxide solution before heating the solution to 90° C.

The specific surface area and the ratio of the absolute strength (h1/h2) based on the above mentioned X-ray diffraction of the obtained powder pigment were measured using the same methods as above and they were found to be 76.1 m$^2$/g and 1.29/1.00, respectively.

Preparation Example 3

While 1,2-bis(2-aminophenoxy)-ethane (73.2 parts) was dispersed in water (300 parts) with stirring, 35% hydrochloric acid (132.9 parts) was added to the dispersion. After stirring the solution for one hour, the temperature of the solution was adjusted to be in the range of 0–5° C. by using ice, and 40% sodium nitrite aqueous solution (41.8 g) was added to the solution to carry out a diazotization reaction. After stirring the solution for more than one hour, sulfamic acid (20 parts) was added and stirred for more than ten minutes to remove excess nitrite, and a bis diazonium salt solution was prepared.

On the other hand, after 5-acetoacetylamino-benzimidazolone (150.8 parts) was dispersed in water (900 parts), 25% sodium hydroxide solution (198 parts) was added to dissolve the compound. While the temperature of the solution was maintained at 5° C. by using ice, the pH of the solution was adjusted to be 5.3 using acetic acid in the presence of dimethylcocoalkylamineoxide (12 parts) to obtain a precipitate.

In order to carry out a coupling reaction, the diazo solution was added to the coupler solution at 25° C. for ten minutes. After the completion of the coupling reaction, powder chalk (40 parts) was added, and after 10 minutes, the pH of the solution was adjusted at 5.0.

Then, the precipitate was filtered and washed with water to obtain water-containing pigment (30% pigment content), and the pigment was dried. Solid matter obtained was ground by using a blender to obtain pigment powder. The specific surface area of the obtained pigment powder was 1 m$^2$/g.

Preparation Example 4

Pigment was prepared by using the same manner as in Preparation Example 3 except that alkylethyleneoxide polyglycol phosphate (6 parts) and fatty alcohol propylene glycol ester (6 parts), which was derived from isotridecyl alcohol, were used instead of dimethylcocoalkylamineoxide (12 parts) and that the coupling reaction was carried out for 30 minutes at 25° C. The specific surface area of the obtained powder pigment was 9.6 m$^2$/g.

Preparation Example 5

A wet product of disazo yellow pigment (30% pigment content) was obtained by filtering, and washing slurry of the pigment, which was obtained by the method as in Preparation Example 4 and further subjecting the resulting material to a heating process, and using directly as a wet product.

The water-containing pigment (367 parts), together with water (1133 parts) and isobutanol (910 parts), was subjected to a pigmentization process at 110° C. for two hours. Then, the obtained substance was filtered and washed with water to obtain water-containing pigment (31% pigment content), and this was dried. Obtained solid matter was ground by using a blender to obtain yellow disazo pigment. The specific surface area of the obtained azo pigment powder was 62 m$^2$/g, and the ratio of the absolute strength (h1/h2) in the above-mentioned X-ray diffraction was 2.19/1.00.

Example 1

After the pigment powder obtained in Preparation Example 1 was mixed with KM-51 (a varnish for lithography ink, a product of Dainippon Ink and Chemicals, Incorporated) and light oil, an offset ink having 17% pigment content and a tack value of 8.5–9.5 was prepared by using a three-piece roller mill. The final compositions of the ink were as shown below.

| Pigment powder | 17 parts |
| KM-51 varnish | 65 parts |
| Light oil | 18 parts |

Example 2 and Comparative Example 1–5

Offset inks were prepared in accordance with the method used in Example 1 except that pigment powder prepared in Preparation Examples 2–6 and a commercially available pigment yellow 180 powder ("Novoperm Yellow P-HG" and "Toner Yellow HG VP2155"; products of Clariant Japan Co.) were used instead of the pigment powder prepared in Preparation Example 1.

(Evaluation method)

The transparency of the offset inks were evaluated by applying the prepared inks to art paper. That is, the transparency of the offset inks were measured and categorized to seven levels (i.e., 1 (lowest transparency) to 7 (highest transparency)) by visual observation based on comparative assessment using an art paper, on which the pigment of Example 1 was applied, as a standard. Also, the color strength of the offset inks were measured and categorized in seven levels (i.e., 1 (lowest color strength) to 7 (highest color strength)) by visual observation of a piece of art paper on which a green ink prepared by subjecting the offset ink (1 part) prepared as above and a blue standard ink (5 parts), which includes phthalocyanine blue, titanium white, and varnish, to an ink mill process of 100 rotations×3 times under applied weight of 300 pounds using a Hoover's muller, was applied in comparison with a piece of art paper obtained from Example 1 as a standard. Results of the evaluation for Examples 1–2 and Comparative Examples 1–5 are tabulated in Table 1.

TABLE 1

| | (pre)pigment used | X-ray strength ratio | Specific surface area | Color strength | Transparency |
|---|---|---|---|---|---|
| Ex. 1 | Preparation Ex. 1 | 1.44/1.00 | 35.0 m$^3$/g | 6 | 6.5 |
| Ex. 2 | Preparation Ex. 2 | 1.29/1.00 | 76.1 m$^3$/g | 7 | 7 |
| Comp. Ex. 1 | Preparation Ex. 3 | ≦1.80 | 1 m$^3$/g | 1 | 5.5 |
| Comp. Ex. 2 | Preparation Ex. 4 | ≦1.80 | 9.6 m$^3$/g | 1 | 5.5 |
| Comp. Ex. 3 | Preparation Ex. 5 | 2.19/1.00 | 62 m$^3$/g | 5 | 5 |
| Comp. Ex. 4 | Novoperm P-HG | 3.88/1.00 | 46.7 m$^3$/g | 3 | 3 |

TABLE 1-continued

|  | (pre)pigment used | X-ray strength ratio | Specific surface area | Color strength | Transparency |
|---|---|---|---|---|---|
| Comp. Ex. 5 | Toner HG VP2155 | 1.99/1.00 | 59.1 m³/g | 5 | 5 |

In Table 1, the specific surface area indicates the BET specific surface area based on a nitrogen absorption process, which was measured by using Micro sorp 4232 II (a product of Micro.Data Co. Ltd.), and the X-ray strength ratio is the ratio between the absolute strength (h1) of the X-ray diffraction at Bragg angle $2\theta=17.5°\pm0.2°$ and the absolute strength (h2) of the X-ray diffraction at Bragg angle $2\theta=18.2°\pm0.2°$ in the powder X-ray diffraction diagram using CuKα characteristic X-ray. Note that the specific surface area and the X-ray strength ratio of the commercially available "Novopern Yellow P-HG" and "Toner Yellow HG VP2155" were measured by using the same method for the colorant obtained in Preparation Examples and tabulated in Table 1.

Example 3

Preparation of Electrostatic Charge Developing Toner

The water-containing pigment (30% pigment content) obtained in Preparation Example 1 and "Himer SBM1100" (a styrene-acrylic acid copolymer resin, a product of Sanyo Chemical Industries, Ltd.) in the following amounts:

|  |  |
|---|---|
| Water-containing pigment | 267 parts |
| Himer SBM100 | 120 parts | were mixed in a kneader for 30 minutes at 100° C. to carry out a flushing process, and a pigment dispersion (master batch) according to an embodiment of the present invention was obtained.

The master batch and the resin in the amounts shown below:

|  |  |
|---|---|
| Master batch | 12.5 parts |
| Himer SBM100 | 92.5 parts | were kneaded in an extruder, and this was ground and separated using a jet mill to obtain toner having average particle size of 10 μm. The obtained toner was mixed with 1.0% of hydrophobic silica ("Aerosil R-972", a product of Nippon Aerosil Co. Ltd.) to obtain electrostatic image developing (two components developing) yellow toner including the pigment according to an embodiment of the present invention.

Note that the temperature range of "Himer SBM100" at which its melt viscosity becomes $1\times10^5$ poise using the devices and conditions mentioned above was between 10 and 170° C.

Evaluation of Color Toner

The two components developing yellow toner was mixed with a commercially available ferrite carrier used for development to obtain a two component developer. When this developer was employed for a development process using a dry type plain paper copier ("Ricopy FT 3010", a product of Ricoh Company, Ltd.), a clear yellow image with no background fog was obtained even after 5,000 pieces of paper were copied (Evaluation is ⊚).

After this, when combined with a cyan developer, in which C.I. Pigment Blue 15:3 was contained, and developed, a clear green was reproduced.

Also, when combined with a magenta developer, in which C.I. Pigment Red 122 was contained, and developed, a clear red was reproduced (Evaluation is ○).

Example 4, Comparative Examples 6–8

An electrostatic image developing (two component developing) yellow toner including the pigment according to an embodiment of the present invention was prepared as in Example 3 except that the water-containing azo pigment obtained in Preparation Examples 2–4 and the water-containing pigment obtained in Preparation Example 5, the amount of which corresponded to 80 g when dried, were used instead of the water-containing pigment (267 parts) obtained in Preparation Example 1. The obtained developers (two components developing yellow toner) were employed for a development process using a dry type plain paper copier ("Ricopy FT 3010", a product of Ricoh Company, Ltd.) as in Example 3. Results are shown in Table 2.

As is obvious from Table 2, when the color toners according to the present invention were used, clear images were obtained since the dispersibility thereof was improved to enhance the transparency and the color strength. On the other hand, when a pigment dispersion including the conventional pigment of known properties were used, images obtained from the developers using the pigment dispersion were unclear since the dispersibility thereof was not sufficient.

Also, when the developer including the pigment dispersion according to an embodiment of the present invention was combined with a cyan developer including C.I. Pigment Blue 15:3 or a magenta developer including C.I. Pigment Red 122, a clear green and a clear red, respectively, was reproduced.

On the other hand, when the developer prepared from the conventional pigment dispersion of known properties was combined with a cyan developer including C.I. Pigment Blue 15:3 or a magenta developer including C.I. Pigment Red 122, its blueness or redness was too strong, and a clear green and a clear red, respectively, could not be obtained.

In addition, the developers including the pigment according to an embodiment of the present invention showed better results in comparison with the developers prepared from conventional pigment of known properties.

TABLE 2

|  |  | Results of developing test |  |
|---|---|---|---|
|  | Material used | Monochrome | Combination |
| Ex. 3 | Preparation Ex.1 | ⊚ | ○ |
| Ex. 4 | Preparation Ex.2 | ⊚ | ⊚ |
| C. Ex.6 | Preparation Ex.3 | x | x |
| C. Ex.7 | Preparation Ex.4 | x | x |
| C. Ex.8 | Preparation Ex.5 | ○ | Δ |

⊚ indicates excellent brightness and excellent color reproducibility
○ indicates good brightness and good color reproducibility
Δ indicates acceptable brightness and acceptable color reproducibility
x indicates bad brightness and bad color reproducibility

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A pigment, comprising:
a chemical compound expressed by the following formula (1), wherein
said pigment has the BET specific surface area based on the nitrogen absorption process of 20–100 $m^2/g$, and
the ratio of the absolute strength of X-ray diffraction at Bragg angle $2\theta=17.5°\pm0.2°$ to the absolute strength of X-ray diffraction at Bragg angle $2\theta=18.2°\pm0.2°$ of said pigment in a powder X-ray diffraction diagram using a CuKα characteristic X-ray is less than 1.8/1.0.

(1)

2. A pigment according to claim 1, further comprising:
a surface treatment agent, the amount of said surface treatment agent being corresponding to 0.1 to 50% by weight of said pigment.

3. A pigment according to claim 1, wherein said pigment is used for coloring printing ink, paint, or plastic.

4. A pigment according to claim 1, wherein said pigment is used for coloring toner, or color filter.

5. A method for manufacturing a pigment according to claim 1, comprising the step of:
simultaneously dropping a bisdiazonium salt of 1,2-bis (2-aminophenoxy) ethane and 5-acetoacetylamino-benzimidazolone into an aqueous solution of pH 4–8 to carry out a coupling reaction.

6. A method for manufacturing a pigment according to claim 1, comprising the steps of:
simultaneously dropping a bisdiazonium salt of 1,2-bis (2-aminophenoxy) ethane and 5-acetoacetylamino-benzimidazolone into an aqueous solution of pH 4–8 to carry out a coupling reaction,
increasing the pH of said solution to be higher than the pH of said solution at the completion of the coupling reactions and
heating said solution to a temperature of 60–95° C.

7. A pigment dispersion, comprising:
a pigment according to claim 1, and
a thermoplastic resin, wherein
0.5–100 parts by weight of said pigment is dispersed in 100 parts by weight of said thermoplastic resin.

8. A pigment dispersion according to claim 7 obtained by the method comprising the step of:
flushing said pigment including water with said thermoplastic resin.

9. An electrostatic image developing powder toner comprising a pigment dispersion according to claim 7.

10. An electrostatic image developing powder toner comprising a pigment dispersion according to claim 8.

* * * * *